(12) United States Patent
Kim

(10) Patent No.: US 9,419,262 B2
(45) Date of Patent: Aug. 16, 2016

(54) BATTERY MODULE

(75) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 485 days.

(21) Appl. No.: 13/206,437

(22) Filed: Aug. 9, 2011

(65) Prior Publication Data

US 2012/0282515 A1 Nov. 8, 2012

(30) Foreign Application Priority Data

May 2, 2011 (KR) .......................... 10-2011-0041597

(51) Int. Cl.
*H01M 2/10* (2006.01)
*H01M 10/04* (2006.01)
*H01M 10/625* (2014.01)
*H01M 10/6556* (2014.01)

(52) U.S. Cl.
CPC .......... *H01M 2/1077* (2013.01); *H01M 2/1083* (2013.01); *H01M 10/0481* (2013.01); *H01M 10/625* (2015.04); *H01M 10/6556* (2015.04)

(58) Field of Classification Search
CPC .......................... H01M 2/1077; H01M 2/1083
See application file for complete search history.

(56) References Cited

U.S. PATENT DOCUMENTS

| 6,326,103 | B1 | 12/2001 | Ido et al. |
| 7,951,478 | B2 | 5/2011 | Takamatsu |
| 2002/0015880 | A1 | 2/2002 | Heimer |
| 2009/0246606 | A1 | 10/2009 | Shimizu |
| 2010/0000816 | A1 | 1/2010 | Okada |
| 2010/0136461 | A1 | 6/2010 | Tsujiko et al. |
| 2010/0190048 | A1 | 7/2010 | Yang et al. |
| 2011/0262799 | A1* | 10/2011 | Kim .............................. 429/156 |

FOREIGN PATENT DOCUMENTS

| EP | 2 381 507 A1 | 10/2011 |
| JP | 2000-149900 A | 5/2000 |
| JP | 2007-280854 A | 10/2007 |
| JP | 2011-023301 A | 2/2011 |
| KR | 10-0590050 B1 | 6/2006 |
| KR | 10-2008-0034220 A | 4/2008 |
| KR | 10-2009-0130328 | 12/2009 |
| KR | 10-2010-0005666 | 1/2010 |

OTHER PUBLICATIONS

KIPO Office action dated Sep. 14, 2012 in priority Korean application No. 10-2011-0041597 (6 pages).
KIPO Notice of Allowance dated Mar. 28, 2013 issued in priority Application No. 10-2011-0041597 (1 sheet).
European Office Action dated Apr. 18, 2012 corresponding to European Application No. 11186783.4, 7 pages.

* cited by examiner

*Primary Examiner* — Barbara Gilliam
*Assistant Examiner* — Stephan Essex
(74) *Attorney, Agent, or Firm* — Lewis Roca Rothgerber Christie LLP

(57) ABSTRACT

A battery module includes a plurality of battery cells, an end plate at a side of the plurality of battery cells, a bottom plate at a bottom of the plurality of battery cells, and a reinforcing member at a first surface of the bottom plate.

14 Claims, 8 Drawing Sheets

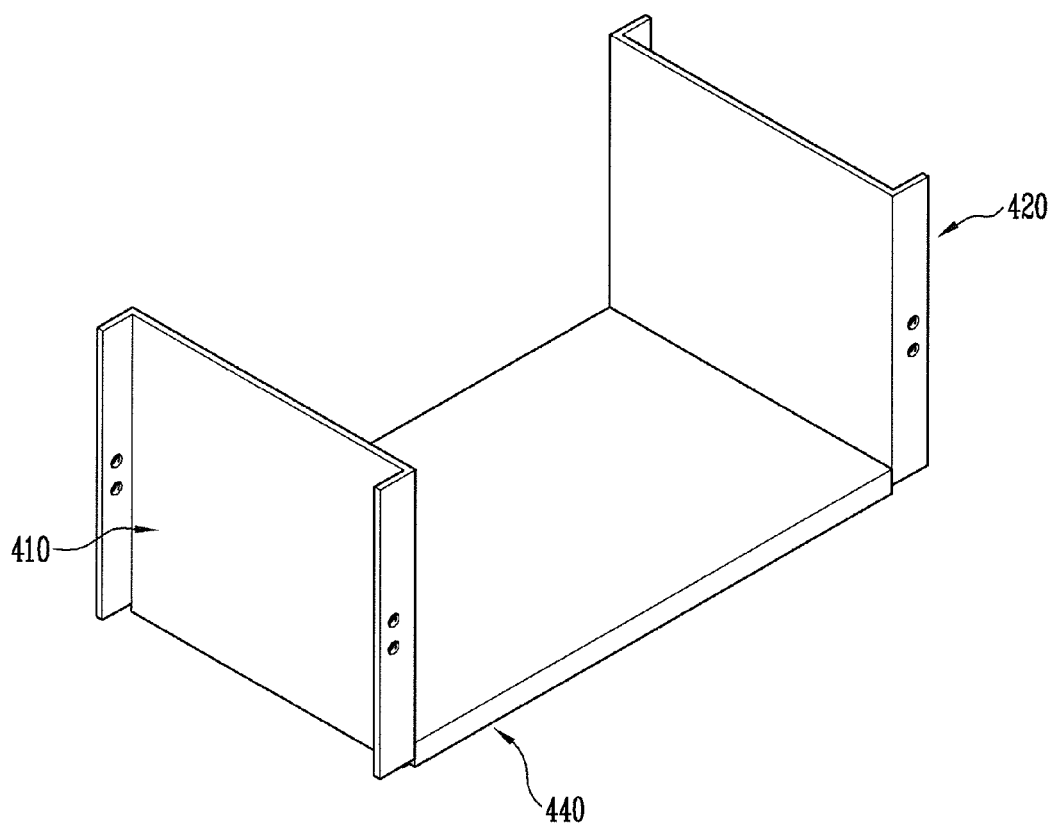

BATTERY MODULE

CROSS-REFERENCE TO RELATED APPLICATION

This application claims priority to and the benefit of Korean Patent Application No. 10-2011-0041597, filed on May 2, 2011, in the Korean Intellectual Property Office, the entire content of which is incorporated herein by reference.

BACKGROUND

1. Field

Embodiments of the present invention relate to a battery module.

2. Description of Related Art

A high-power battery module using a non-aqueous electrolyte with high energy density has recently been developed. The high-power battery module is configured as a large-capacity battery module manufactured by coupling a plurality of battery cells in series, so as to be used in driving motors of devices requiring high power, e.g., electric vehicles and the like.

Battery modules are properly modified to be used in various fields. In a battery module, a plurality of battery cells may be moved, perhaps undesirably, such as by an external impact or the like. Therefore, the electrical connection of the battery module may be disconnected, or an unsafe condition might occur. Studies have been conducted in various fields to develop a battery module which stably fixes a plurality of battery cells, has a small size, and is lightweight. Further, such battery modules with light weight and small size, improved safety, and resistance against external impact or the like, stable fixing, and the like, may be particularly suited for driving a motor for propelling an electric vehicle or a hybrid electric vehicle.

SUMMARY

Embodiments of the present invention provide a battery module which enables a plurality of battery cells to be firmly fixed therein.

Embodiments of the present invention also provide a battery module using a novel member.

According to an aspect of embodiments of the present invention, there is provided a battery module including a plurality of battery cells, an end plate at a side of the plurality of battery cells, a bottom plate at a bottom of the plurality of battery cells, and a reinforcing member at a first surface of the bottom plate.

The reinforcing member on a mounting portion may be indented inward from an outer surface of the bottom plate.

The mounting portion may have a shape corresponding to a shape of the reinforcing member.

The mounting portion may be at a central portion of the bottom plate.

The reinforcing member may include at least one of steel or aluminum.

The end plate may include first and second end plates, at least one of the first end plate or the second end plate may include a first fastening portion that contacts an end of the reinforcing member, and the reinforcing member may include a second fastening portion corresponding to the first fastening portion.

The first fastening portion or the second fastening portion may have at least one hole, and the first and second fastening portions may be penetrated by a fastening member configured to fasten the first end plate or the second end plate to the reinforcing member.

The fastening member may include a bolt or a stud, and the second fastening portion may further have at least one opening at two ends of the reinforcing member and an insert nut in each opening of the at least one opening.

The first and second fastening portions may be configured to be fastened by a groove-projection connection or a hook connection.

The reinforcing member may be configured to be integrally joined with the end plate.

The reinforcing member may be welded to the end plate.

The bottom plate may have at least one first through-hole.

The reinforcing member may have a second through-hole corresponding to the first through-hole.

The end plate may include first and second end plates, and the battery module may further include a connecting member configured to couple the first and second end plates to each other.

The connecting member may include side plates that respectively support side surfaces of the battery cells.

As described above, according to embodiments of the present invention, it is possible to provide a battery module in which a plurality of battery cells are firmly fixed, thereby improving safety of the battery module.

Also, it is possible to provide a battery module of which weight is decreased using a novel member.

The battery module according to embodiments of the present invention are particularly applicable to driving a motor for propelling an electrical vehicle or a hybrid electric vehicle, without necessarily being limited thereto, due to one or more aspects, such as its resistance against external impact, its improved safety, its being firmly fixed, and its decreased weight.

BRIEF DESCRIPTION OF THE DRAWINGS

The accompanying drawings, together with the specification, illustrate exemplary embodiments of the present invention, and, together with the description, serve to explain the aspects of embodiments of the present invention.

FIG. 6B is an assembled perspective view of the embodiment shown in FIG. 6A.

DETAILED DESCRIPTION

Figure 1:
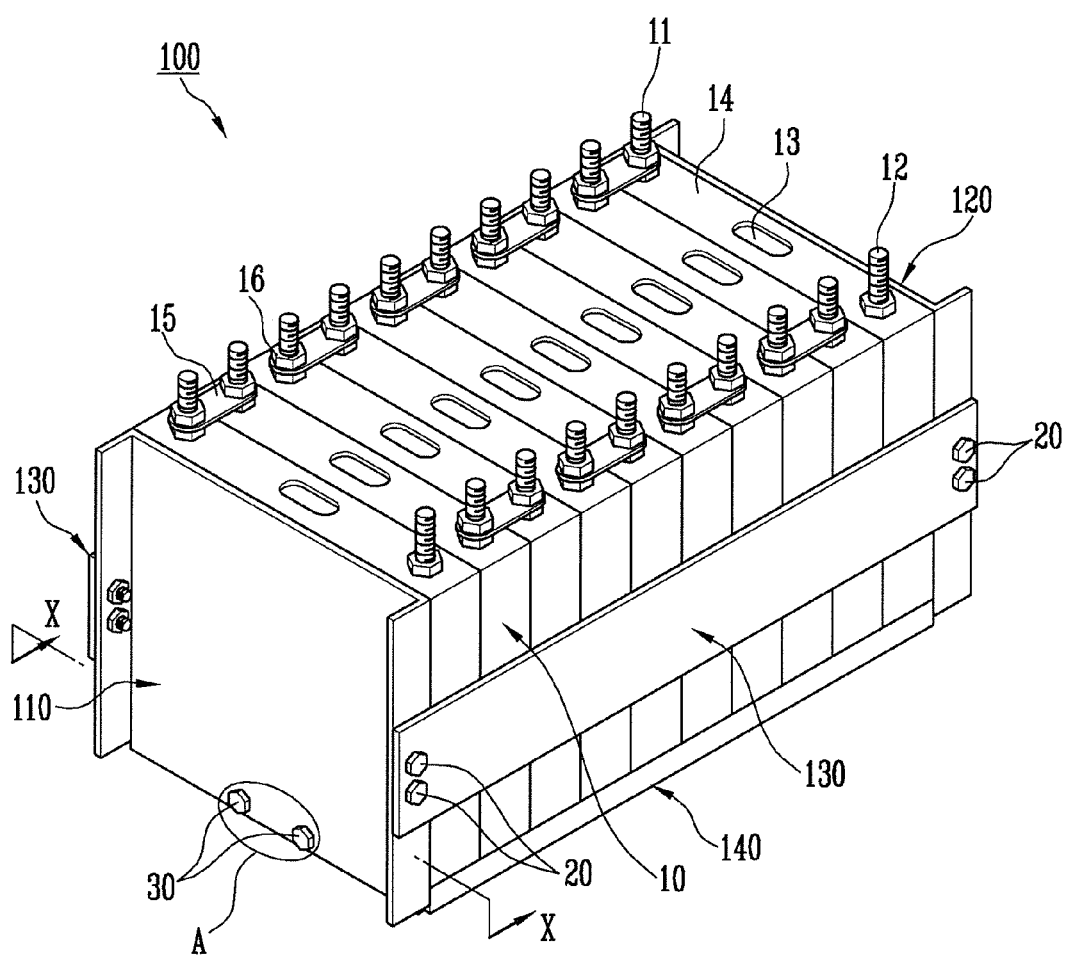
FIG. 1 is a perspective view of a battery module according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or it can be indirectly on the another element with one or more intervening elements interposed therebetween. Also, when an element is referred to as being "connected to" or "coupled to" another element, it can be directly connected to the another element or can be indirectly connected to the another element with one or more intervening elements interposed therebetween. Hereinafter, like reference numerals refer to like elements. In the drawings, the thickness or size of layers are exaggerated for clarity and not necessarily drawn to scale.

Hereinafter, exemplary embodiments of the present invention will be described with reference to the accompanying drawings.

Figure 2:
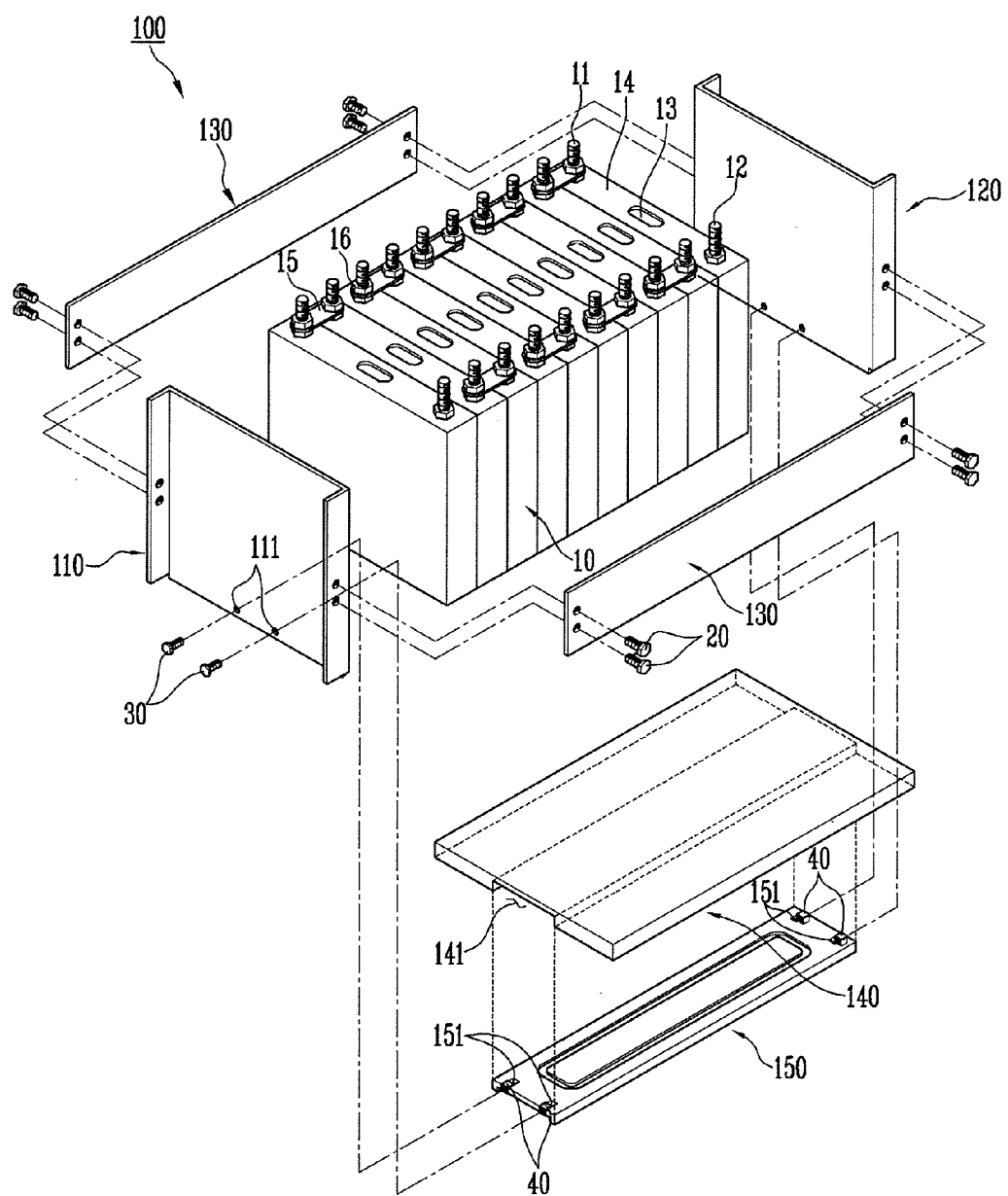
FIG. 2 is an exploded perspective view of the embodiment shown in FIG. 1.

FIG. 1 is a perspective view of a battery module according to an embodiment of the present invention. FIG. 2 is an exploded perspective view of the embodiment shown in FIG. 1.

Referring to FIGS. 1 and 2, the battery module 100 according to the present embodiment includes a plurality of battery cells 10 aligned in one direction; one or more end plates (e.g., first and second end plates 110 and 120) respectively disposed at outer sides of the battery cells 10; a bottom plate 140 provided at bottoms of the battery cells; and at least one reinforcing member 150 provided to a first surface of the bottom plate 140.

The battery cell 10 may be manufactured by accommodating an electrode assembly and an electrolyte in a battery case and then sealing the battery case with a cap plate 14. The cap plate 14 may include positive and negative electrode terminals 11 and 12 on respective ends on the cap plate 14, and a vent 13 between the terminals 11 and 12. The vent 13 serves as a path through which gas generated in the battery cell 10 may be exhausted to the outside of the battery cell 10. The electrode assembly may be composed of a positive electrode plate, a negative electrode plate, and a separator interposed between these electrode plates. The positive electrode plate is coupled to the positive electrode terminal 11 provided on the cap plate 14, and the negative electrode plate is coupled to the negative electrode terminal 12 provided on the cap plate 14. The electrode assembly composed of the electrode plates generates electromagnetic energy (e.g., electricity) through an electrochemical reaction between the electrode assembly and the electrolyte.

The first and second end plates 110 and 120 and the bottom plate 140 may define a space (e.g., a predetermined space) for accommodating the plurality of battery cells 10. The battery cells 10 may be fixed in the defined space by being accommodated in the space and aligned in one direction. In the present embodiment, the battery cells 10 are aligned in parallel so that wide front surfaces of the battery cells are opposite to each other. The positive and negative electrode terminals 11 and 12 of neighboring battery cells 10 may be electrically coupled to each other through a bus-bar 15. The bus-bar 15 is provided with holes through which the positive and negative electrode terminals 11 and 12 respectively penetrate. The bus-bar 15 through which the terminals penetrate so as to be coupled thereto may be fixed by fixing members such as, for example, nuts 16. The positive and negative electrode terminals 11 and 12 may be alternately aligned so that the plurality of battery cells 10 are coupled in series or in parallel by the bus-bars 15.

The battery module 100 may further include a connecting member 130 that couples the first and second end plates 110 and 120 to each other. As described above, the plurality of battery cells 10 may constitute the one battery module 100 using the first and second end plates 110 and 120 and the bottom plate 140, and therefore, the connecting member 130 may not be necessary in the battery module 100 of such an embodiment. On the other hand, the connecting member 130 may firmly couple the first and second end plates 110 and 120 using bolts 20 or the like, and thus, the battery cells can be more stably fixed in the battery module 100. For example, the connecting member 130 may include side plates that respectively support both side surfaces of the battery cells 10.

The first and second end plates 110 and 120, the connecting member/side plates 130, or the bottom plate 140 constitute a kind of housing for stably fixing the plurality of battery cells 10, and the shape or number of each may be variously designed. However, the present invention is not limited to any such embodiments.

Figure 3A:
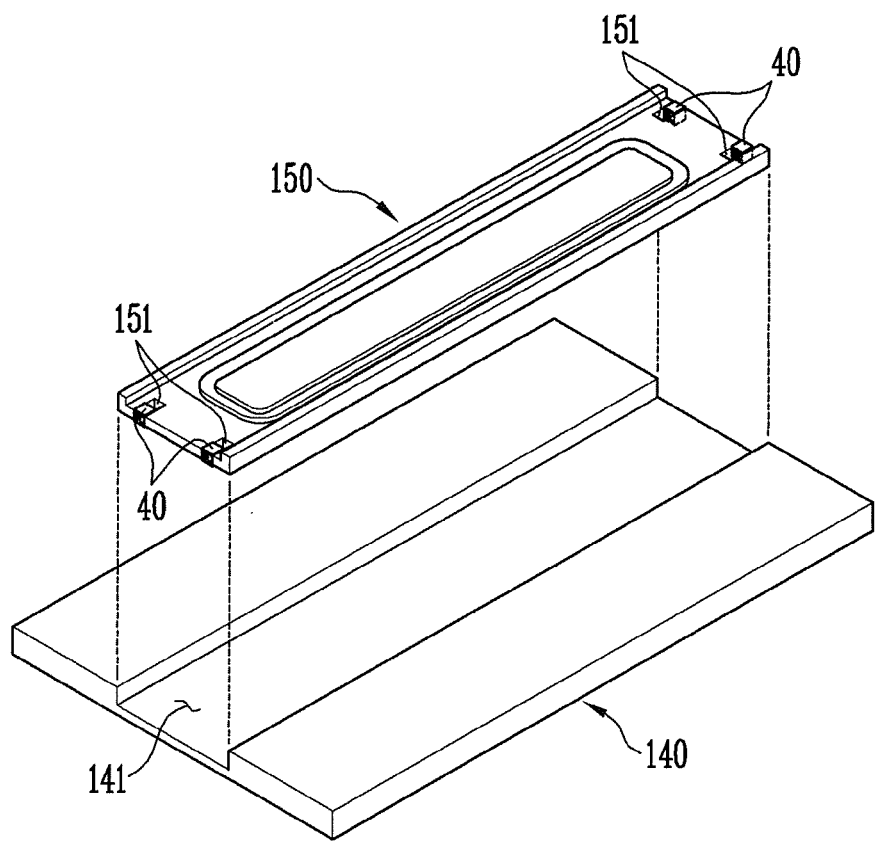
FIG. 3A is a perspective view of a bottom plate and a reinforcing member according to the embodiment shown in FIG. 1.
Figure 3B:
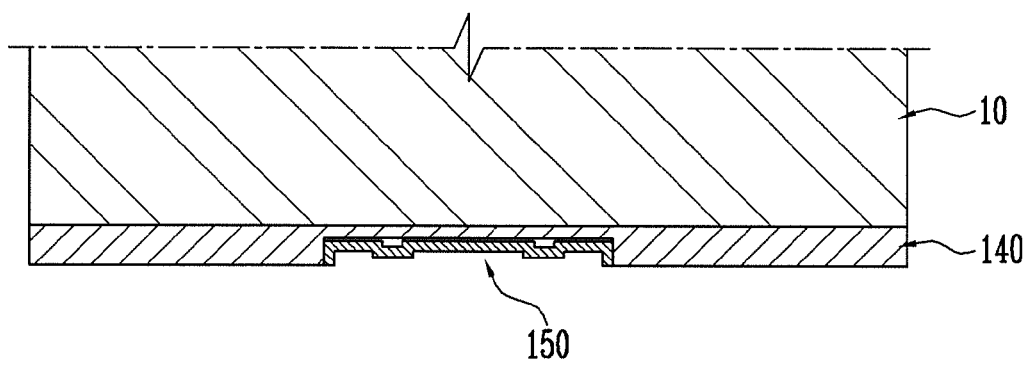
FIG. 3B is a sectional view taken along the line X-X of FIG. 1.
Figure 3C:
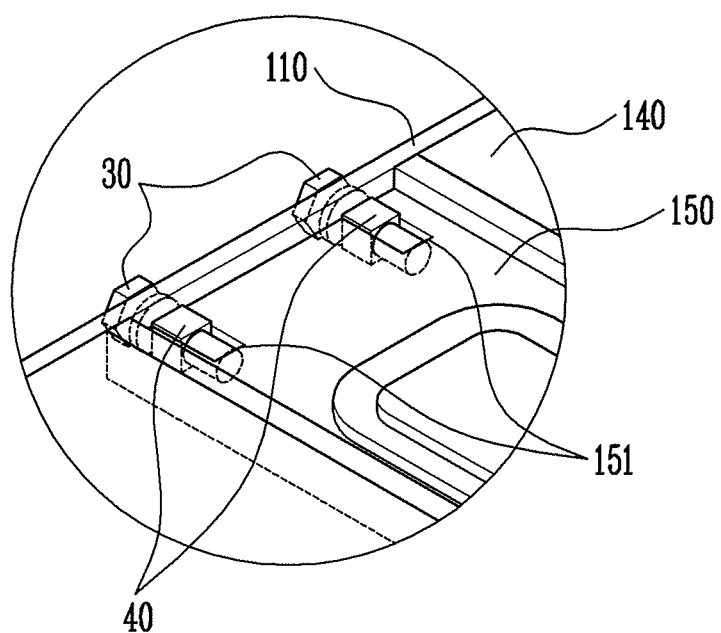
FIG. 3C is a perspective view of the portion A of FIG. 1.

FIG. 3A is a perspective view of a bottom plate and a reinforcing member according to the present embodiment. FIG. 3B is a sectional view taken along the line X-X of FIG. 1. FIG. 3C is a perspective view of the portion A of FIG. 1.

Referring to FIGS. 3A to 3C, the bottom plate 140 further includes a mounting portion 141 on which the reinforcing member 150 is mounted, and the mounting portion 141 may be indented inward from an outer surface of the bottom plate 140. The reinforcing member 150 is provided to the first surface of the bottom plate 140, and the first surface may be at least one of a surface that comes in contact with the bottom surfaces of the battery cells 10 and a back surface thereof. Although, in the present embodiment, the reinforcing member 150 is overlapped with the back surface, which comes in contact with the bottom surfaces of the battery cells 10, the present invention is not limited thereto.

Generally, in a battery module including a plurality of battery cells, the weight of the battery cells may be concentrated on (e.g., generally supported by) a bottom plate. Therefore, the bottom plate may be manufactured using a material having a higher strength than that of an end plate, a connecting member, or the like, or may be manufactured with a thickness that is greater than that of an end plate. The bottom plate manufactured in such a manner may increase the weight and volume of the battery module. In the present embodiment, the battery module 100 further includes the reinforcing member 150 overlapped with the bottom plate 140, thereby providing the small and light battery module 100. For example, the reinforcing member 150 may include at least one of steel and aluminum.

Referring to FIG. 3B, the mounting portion 141 of the bottom plate 140 may have a shape corresponding to the reinforcing member 150. The mounting portion 141 indented inward from the outer surface of the bottom plate 140 may correspond to the shape of the reinforcing member 150. The reinforcing member 150 overlapped with the bottom plate 140 can be mounted in the mounting portion 141, and the battery module 100 can maintain a substantially flat surface without unevenness that might otherwise be caused by the reinforcing member 150. Thus, the battery module 100 has certain limitations removed, such as interference caused by the reinforcing member 150 when the battery module 100 is mounted or when neighboring battery modules 100 are coupled to each other.

The mounting portion 141 may be at a central portion of the bottom plate 140. The reinforcing member 150 may be able to distribute the weight of the battery cells 10, which may be concentrated on (e.g., generally supported by) the bottom plate 140, by reinforcing the strength of the bottom plate 140. In the present embodiment, the reinforcing member 150 is provided at the central portion of the bottom plate 140, thereby effectively distributing the weight of the battery cells 10.

Referring to FIG. 3C, the first or second end plate 110 or 120 may have a first fastening portion 111 (see FIG. 2) formed at a portion that comes in contact with one end of the reinforcing member 150, and the reinforcing member 150 may be provided with a second fastening portion formed at a portion corresponding to the first fastening portion 111. The first fastening portion 111 or the second fastening portion may include one or more holes. The first fastening portion 111 or the second fastening portion may be penetrated by a fastening member 30 so that the first or second end plate 110 or 120 is fastened to the reinforcing member 150. For example, the fastening member 30 may include a bolt or stud.

The second fastening portion may correspond to the first fastening portion 111. In the present embodiment, the second fastening portion may have one or more openings 151 at one end or the other end of the reinforcing member 150 and insert nuts 40 respectively inserted into the openings 151. According to the present embodiment, the openings 151 may be provided by cutting away a portion of a corner at the one end or the other end of the reinforcing member 150 so as to correspond to the first fastening portion 111. The insert nut 40 may be inserted into the opening 151. Thus, the first fastening portion 111, the opening 151, and the insert nut 40 can collectively form a path that can accommodate the fastening member 30.

The first fastening portion 111 and the second fastening portion are used to couple the first end plate 110 and the reinforcing member 150 to each other, but the present invention is not limited thereto. The second end plate 120 may also be applied in the same manner as the first end plate 110. For example, the first fastening portion 111 and the second fastening portion may be fastened by a groove-projection connection or hook connection. The fastening method may be variously modified according to the design of the battery module 100 of embodiments of the present invention.

Hereinafter, other embodiments of the present invention will be described with reference to FIGS. 4A to 6B. In FIGS. 4A to 6B, relevant features not included the following description are substantially similar to those described in reference to FIGS. 1 to 3C, and therefore, their detailed descriptions can be omitted.

Figure 4A:
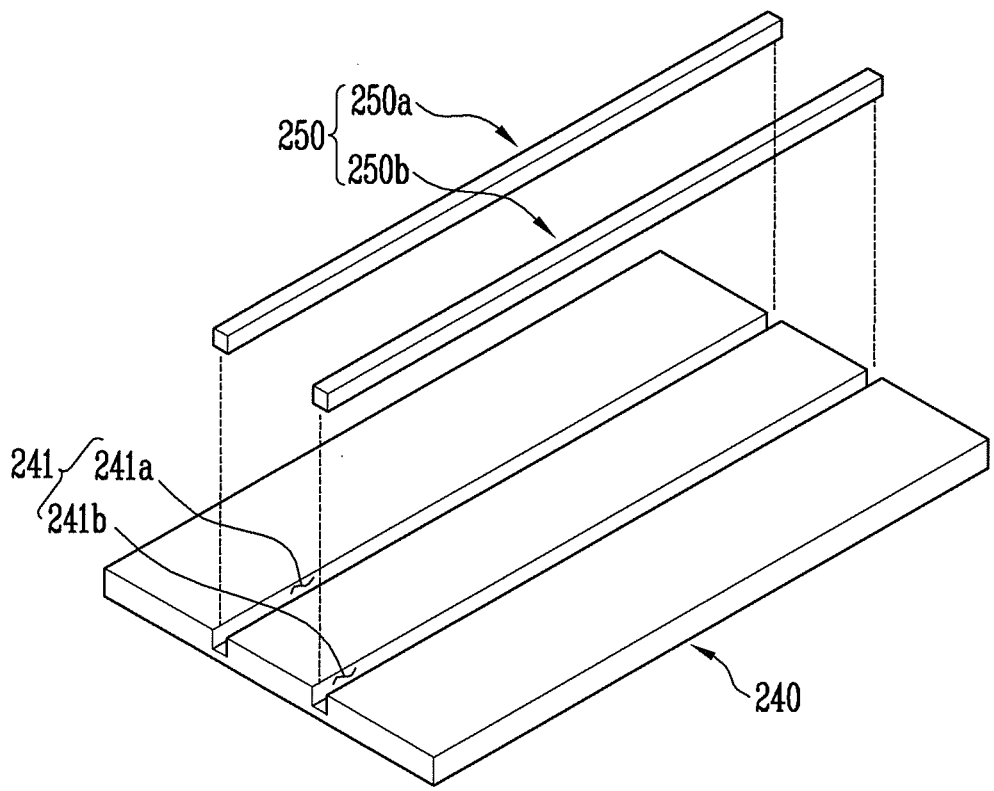
FIG. 4A is a perspective view of a bottom plate and a reinforcing member according to another embodiment of the present invention.
Figure 4B:
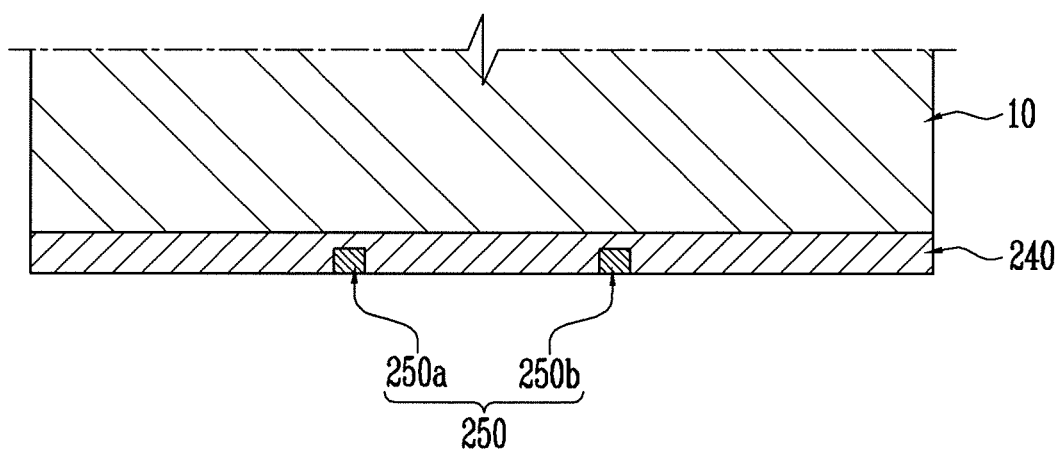
FIG. 4B is a sectional view showing a lower portion of a battery module according to the embodiment shown in FIG. 4A.

FIG. 4A is a perspective view of a bottom plate and a reinforcing member according to another embodiment of the present invention. FIG. 4B is a sectional view showing a lower portion of a battery module 100 according to the embodiment of the present invention shown in FIG. 4A.

Referring to FIGS. 4A and 4B, the battery module 100 according to this embodiment may include a bottom plate 240 that supports bottom surfaces of battery cells 10, and at least one reinforcing member 250 provided to be overlapped with the bottom plate 240. The reinforcing member 250 may be composed of first and second reinforcing members 250a and 250b, and the bottom plate 240 may include a mounting portion 241 that may be composed of first and second mounting portions 241a and 241b on which the first and second reinforcing members 250a and 250b are respectively mounted.

FIG. 4B is a sectional view showing a lower portion of the battery module 100 according to the present embodiment. In FIG. 4B, the bottom surfaces of the battery cells 10 come in contact with an inner surface of the bottom plate 240, and the mounting portion 241 may be provided to an outer surface of the bottom plate 240. The first and second mounting portions 241a and 241b may correspond to the first and second reinforcing members 250a and 250b, respectively. The number and material of the reinforcing member 250 and the mounting portion 241 may be variously modified, and thus, the reinforcing member 250 and the mounting portion 241 can be usefully applied to the battery module 100.

Figure 5:
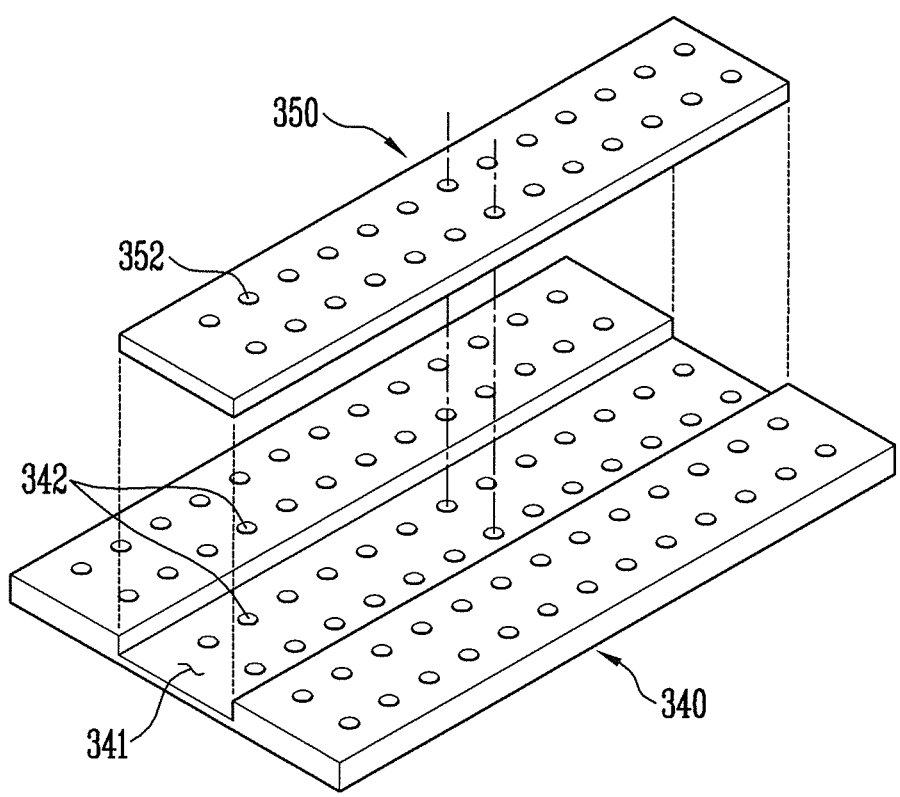
FIG. 5 is a perspective view of a bottom plate and a reinforcing member according to still another embodiment of the present invention.

FIG. 5 is a perspective view of a bottom plate and a reinforcing member according to still another embodiment of the present invention.

Referring to FIG. 5, the battery module 100 according to this embodiment may include a bottom plate 340 that supports a plurality of battery cells 10, and at least one reinforcing member 350 provided to be overlapped with the bottom plate 340. A mounting portion 341 indented inward may be provided to the bottom plate 340 so that the reinforcing member 350 is mounted thereon. The bottom plate 350 may further include one or more first through-holes 342.

Generally, a battery cell may generate heat during a charging/discharging process thereof, and the generation of heat may promote deterioration of the battery cell. Particularly, in a case where the battery cell is a high-capacity battery cell, the generation of heat may be problematic to the safety of the battery cell, and therefore, it is necessary to control the generation of heat.

In the present embodiment, the first through-hole(s) 342 provided to the bottom plate 350 may serve as a path of coolant, and coolant flowing through the first through-hole(s) 342 enables the battery cell to maintain an optimum or near optimum temperature. The reinforcing member 350 overlapped with the bottom plate 340 may also include one or more second through-holes 352 formed at a position corresponding to the first through-hole(s) 342. The second through-hole(s) 352 provided to the reinforcing member 350 may form a path extended to the first through-hole(s) 342, and the coolant can flow into the battery module 100 through the path without limitation caused by the reinforcing member 350, thereby effectively enabling heat exchange with the battery cells 10.

Figure 6A:
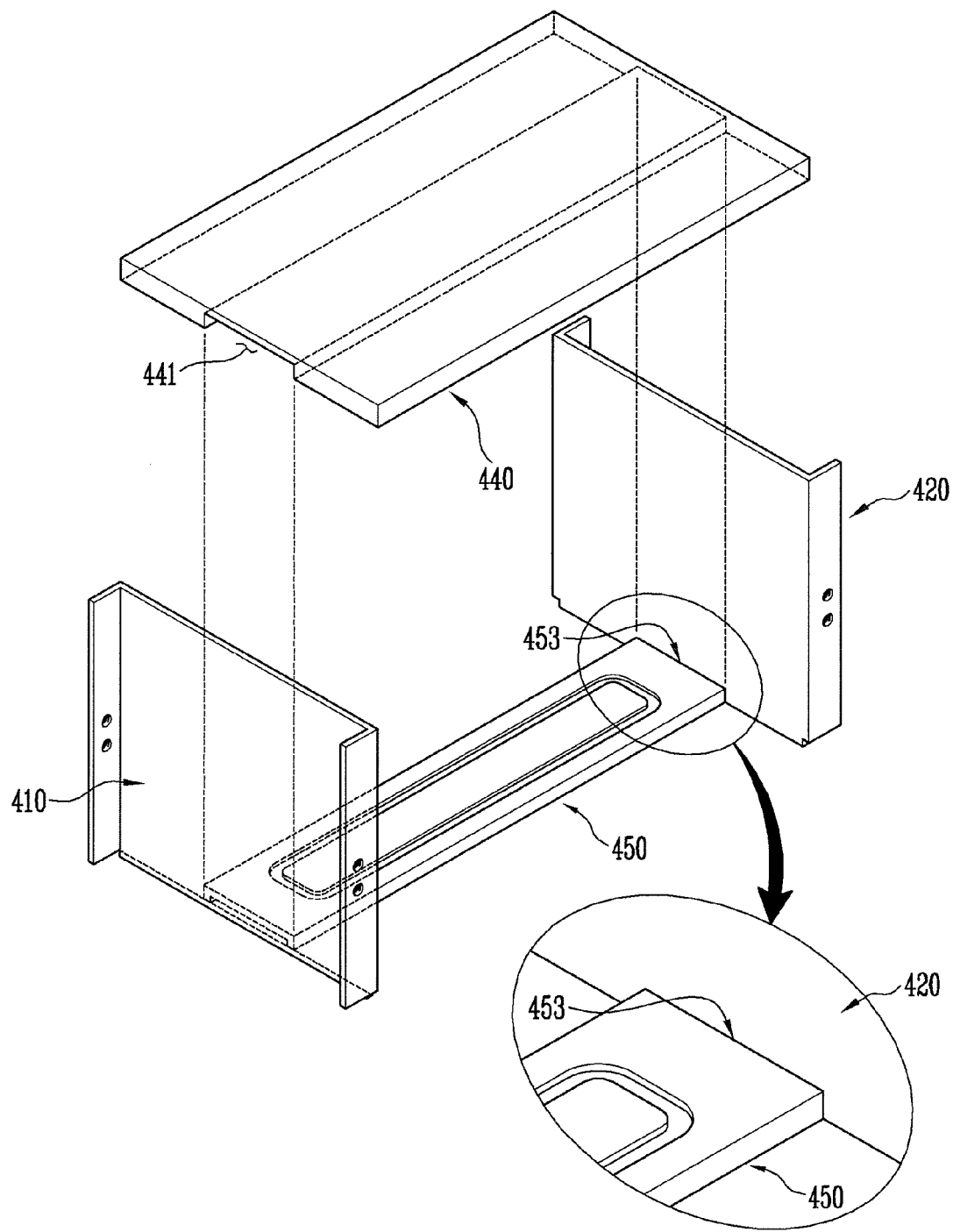
FIG. 6A is an exploded perspective view of end plates, a bottom plate, and a reinforcing member according to yet another embodiment of the present invention.

FIG. 6A is an exploded perspective view of end plates, a bottom plate, and a reinforcing member according to still another embodiment of the present invention. FIG. 6B is an assembled perspective view of FIG. 6A.

Referring to FIGS. 6A and 6B, the battery module 100 according to the present embodiment may include first and second end plates 410 and 420 respectively provided to outermost surfaces of a plurality of battery cells 10, a bottom plate 440 and a reinforcing member 450, which support bottom surfaces of the battery cells 10. The bottom plate 440 may further include a mounting portion 441 that is a portion on which the reinforcing member 450 is mounted.

The reinforcing member 450 may be integrally joined with the first and second end plates 410 and 420. In the present embodiment, the reinforcing member 450 may be joined with the first and second plates 410 and 420 through welding, although the present invention is not limited thereto.

The reinforcing member 450 is overlapped with the bottom plate 440 so that both ends of the reinforcing member 450 come in contact with the first and second end plates 410 and 420, respectively. In the battery module 100, the reinforcing member 450 may be provided more outwardly than the bottom plate 440 (e.g., the reinforcing member 450 may have a surface that extends beyond a surface of the bottom plate 440). The reinforcing member 450 may be integrally joined with the first and second end plates 410 and 420. In a case where the reinforcing member 450 may be integrally joined with the first and second end plates 410 and 420, as described above, the reinforcing member 450 can support the bottom plate 440. Thus, the plurality of battery cells 10 supported by the bottom plate 440 can be more stably supported.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of battery cells;
   an end plate at a side of the plurality of battery cells;
   a bottom plate at a bottom of the plurality of battery cells, the bottom plate comprising an indented portion comprising a mounting portion, wherein outer surfaces of the bottom plate outside of the indented portion are coplanar with each other; and
   a reinforcing member at a first surface of the bottom plate and mounted in the mounting portion of the bottom plate,
   wherein the mounting portion is indented inward from the outer surfaces of the bottom plate, and
   wherein the mounting portion has a shape corresponding to a shape of the reinforcing member and an upper surface of the reinforcing member is parallel to a corresponding surface of the mounting portion along the entire length of the reinforcing member, and
   wherein a bottom surface of the reinforcing member mounted in the mounting portion and the outer surfaces of the bottom plate form a substantially flat surface.

2. The battery module according to claim 1, wherein the mounting portion is at a central portion of the bottom plate.

3. The battery module according to claim 1, wherein the reinforcing member comprises at least one of steel or aluminum.

4. The battery module according to claim 1, wherein the end plate comprises first and second end plates, at least one of the first end plate or the second end plate comprises a first fastening portion that contacts an end of the reinforcing member, and the reinforcing member comprises a second fastening portion corresponding to the first fastening portion.

5. The battery module according to claim 4, wherein the first fastening portion or the second fastening portion has at least one hole, and the first and second fastening portions are penetrated by a fastening member configured to fasten the first end plate or the second end plate to the reinforcing member.

6. The battery module according to claim 5, wherein the fastening member comprises a bolt or a stud, and the second fastening portion further has at least one opening at two ends of the reinforcing member and an insert nut in each opening of the at least one opening.

7. The battery module according to claim 4, wherein the first and second fastening portions are configured to be fastened by a groove-projection connection or a hook connection.

8. The battery module according to claim 1, wherein the reinforcing member is configured to be integrally joined with the end plate.

9. The battery module according to claim 8, wherein the reinforcing member is welded to the end plate.

10. The battery module according to claim 1, wherein the bottom plate has at least one first through-hole.

11. The battery module according to claim 10, wherein the reinforcing member has a second through-hole corresponding to the first through-hole.

12. The battery module according to claim 1, wherein the end plate comprises first and second end plates, and the battery module further comprises a connecting member configured to couple the first and second end plates to each other.

13. The battery module according to claim 12, wherein the connecting member comprises side plates that respectively support side surfaces of the battery cells.

14. The battery module according to claim 1, wherein the reinforcing member mounted in the mounting portion is indented inward from the outer surfaces of the bottom plate.

* * * * *